United States Patent [19]

Byrd et al.

[11] 4,364,991

[45] Dec. 21, 1982

[54] FIRE RESISTANT COMPOSITIONS AND COMPOSITES

[75] Inventors: Norman R. Byrd, Villa Park; Daniel C. Peek, Long Beach, both of Calif.

[73] Assignee: McDonnell Douglas Corporation, Long Beach, Calif.

[21] Appl. No.: 190,741

[22] Filed: Sep. 25, 1980

[51] Int. Cl.³ .............................. 524 137; B32B 27/38; B32B 27/36; B32B 27/34; B32B 27/30; B32B 27/28; B32B 27/18; C08K 5/53; C08K 5/50

[52] U.S. Cl. .................................. 428/265; 427/386; 427/387; 427/385.5; 427/407.3; 427/389.8; 428/268; 428/490; 524/84; 524/100; 524/111

[58] Field of Search ............... 260/45.9 NC, 45.9 NP; 428/435, 458, 474, 413, 417, 418, 431, 442, 463, 436, 429, 431, 450, 921; 525/340, 341; 524/84, 100, 111, 137

[56] References Cited

U.S. PATENT DOCUMENTS

| | | | |
|---|---|---|---|
| 3,004,005 | 10/1961 | Malz et al. .......................... | 525/340 |
| 3,224,889 | 12/1965 | Schulde et al. ............. | 260/45.9 NP |
| 3,449,161 | 6/1969 | Hindersinn et al. ........ | 260/45.9 NP |
| 3,449,308 | 6/1969 | Blatz ........................... | 360/45.9 NP |
| 3,575,891 | 4/1971 | Le Blanc et al. ........... | 260/45.9 NP |
| 3,645,971 | 2/1972 | Hindersinn ................... | 260/45.9 NP |
| 3,971,753 | 7/1976 | Frechtling et al. ......... | 260/45.9 NP |
| 4,134,877 | 1/1979 | Morgan et al. ............. | 260/45.9 NP |

*Primary Examiner*—Veronica P. Hoke
*Attorney, Agent, or Firm*—Max Geldin

[57] ABSTRACT

Highly fire resistant composites or laminates particularly applicable as structural components in aircraft, e.g. in the engine nacelle, as part of the acoustic panel-fire wall structure, and capable of withstanding a 2,000° F. flame temperature, comprising incorporating an additive in the form of a phosphorylated amide, into a resin, e.g., a polyimide or an epoxy resin, such additive being soluble in the resin. The resulting resin containing the additive, e.g., phenyl phosphonic acid diamide, is then applied to or impregnated into a substrate such as glass fiber cloth or graphite fiber, to form a composite structure which is then cured. The resulting cured composite when subjected to high temperatures of the order of, e.g., a 2,000° F. flame temperature, forms a resin char of reduced thermal conductivity which holds the fibers of the laminate together and maintains the structural stability and integrity of the laminate.

51 Claims, No Drawings

FIRE RESISTANT COMPOSITIONS AND COMPOSITES

BACKGROUND OF THE INVENTION

This invention relates to thermal insulation materials having high fire resistance and low thermal conductivity, and is particularly concerned with resin compositions and composites, particularly polyimide or epoxy resin compositions, and composites formed therewith, incorporating certain additives to substantially increase fire resistance, and which are particularly applicable as structural components, e.g., as an acoustic panel-fire wall structure in aircraft.

Considerable effort and funds have been expended over the past several years in programs to develop the potential of organic composite materials for use in aircraft structures, among others. These studies have shown that the use of high-stiffness, high-strength composites, such as graphite-epoxy, can reduce the weight of structural components by as much as 50%, and thus improve structural efficiency while providing significant benefits in cost and performance. The most commonly employed class of resins for this use, depending upon the particular application, are epoxies, polyesters, phenolics and polyimides.

Thus, using graphite-polyimide as the composite, a structural component is available that has good strength, is light-weight, and has some fire resistance, in that the polyimide will not readily burn at low temperatures. However, at 2,000° F. flame conditions, the polyimide will burn and decompose to form a char on the flame side. This char, though, is so thin that it will allow heat to get through to the backside and decompose the resin. Thus, this could create a hazard due to the possibility of the decomposition products igniting, thereby generating a fire on the backside, even though the parent polymer e.g. polyimide, does not readily burn. Furthermore, with the resin volatilizing, or burning away, the heat transfer through the backside is sufficient to ignite other combustible articles in contact with this fire wall. Therefore, a need exists for a non-burning resin composite that has good stability, is a good char former, and has low thermal conductivity.

There are two problem areas where such a non-burning resin composition can be used on an aircraft: (1) in the engine nacelle, as part of the acoustic panel-fire wall structure, and for this application, polyimides are particularly desirable; and (2) as part of the external surface where graphite-epoxies are the usual materials of construction.

In regard to this latter case, instances have been reported of the resultant degradation of graphite-epoxy composites due to fire and the consequent breaking up of the graphite fibers and the spreading of these fibers to electrical equipment. Thus, any method that is developed to contain these short conductive fibers and prevent their spreading would be of great value.

Therefore, the use of graphite fiber-resin composites depends not only on the strength of the composite due to the presence of the graphite, but on the fire resistance of the resin, as well. There are many additives that, when incorporated into the resin, will act as fire retardants. Some, such as alumina trihydrate, ammonium phosphate, and zinc borate, are solids that offer excellent fire resistance. The hydrated alumina will offer fire protection by giving off water at a relatively low temperature; however, this temperature is usually around the processing temperature of some resins, e.g., polyimides. Ammonium phosphate and zinc borate are effective at higher temperatures, but, as with the hydrated alumina, these are all solid particulates, and they adversely affect the mechanical properties of the laminate, i.e. cause increase in laminate thickness with a consequent decrease in strength. Many other additives are available that are soluble in the resin, but they are good fire retardants only at relatively low fire temperatures, i.e. around 500° F. to 1,000° F.

There accordingly has arisen the need for a substance which can be incorporated into the resin and which will give protection to the resin at high temperatures, e.g., of the order of 2,000° F., to provide a resin composition which is non-burning and has a low thermal conductivity, and wherein such substance functions as a char stabilizer. However, use of resin-soluble additives for this purpose such as the reaction product of hydroquinone and phenylphosphonic dichloride, although alleged to be a fire retardant when impregnated into clothing (Ger. Offen. 2,236,038, Jan. 31, 1974; Ger. Offen. No. 2,236,039, Jan. 31, 1974; Ger. Offen. No. 2,346,787, Apr. 3, 1975; U.S. Pat. Nos. 3,853,819; 3,894,986; 3,900,444; and 3,941,752), will not withstand temperatures much above 1,000° F. Thus, for aircraft utilization, whether in the engine nacelle, or on the external skin, where burning fuel fires could result in temperatures around 2,000° F., any organic-soluble additive that can result in a stabilized char upon burning is needed.

It has been known that phosphorus derivatives make good fire retarding agents, as exemplified by the following: U.S. Pat. Nos. 3,941,752; 3,900,444; 3,894,986; 3,853,819; 2,577,281; 2,642,413; 2,716,639; 3,450,677; 3,640,823; 3,685,974; and 3,712,789. U.S. Pat. No. 2,642,413 uses an organo-phosphonic acid diamide and forms polymers thereof with ureas. U.S. Pat. No. 3,450,677 prepares polymers from a diamine and an organic phosphite, phosphonite or phosphonic dihalide. The resulting materials are then treated with isocyanates to prepare polyureas, but are not employed as additives for resin composites.

However, much of the work with fire retardant compositions has been concerned with incorporation of various phosphorylated derivatives into polyurethanes, or fiber forming compositions. Furthermore, in most cases, these compositions have had to be stable to relatively low flame conditions, such as burning matches, cigarettes or burning wood, e.g., up to about 800°–1,000° F. When incorporated into a glass cloth-polyimide resin laminate and burned at 2,000° F. (the FAA requirement for burn-through stability), they did not pass.

However, certain compounds have been used as fire retardants that were found to show excellent fire resistance to a 2,000° F. flame. Notable among these was ammonium phosphate.

Accordingly, one object of the invention is to provide resin compositions and composites having high fire resistance and low thermal conductivity. Another object is the provision of compositions and composites of the above type having utility as a fire barrier, particularly applicable as an aircraft structural component, e.g., an acoustic panel-firewall structure capable of withstanding high temperature, e.g., a 2,000° F. flame temperature. A still further object is the provision of resin compositions, particularly polyimide and epoxy compositions, and composites produced therefrom, such as polyimide-glass fabric or epoxy-glass fabric composites or laminates, having incorporated therein a substance which substantially increases the fire resistance of the resin and reduces its thermal conductivity, substantially without adversely affecting the physical and mechanical properties of the composite, and which functions to stabilize the resin or resin char, at high temperatures, e.g., a 2,000° F. flame temperature, and maintains the structural integrity of the composite.

SUMMARY OF THE INVENTION

The above objects and advantages are achieved, according to the invention, by incorporating into a resin such as a polyimide or an epoxy, a phosphorylated amide, particularly in the form of an amide of various organic phosphonic and thiophosphonic acids, as described in greater detail below. Such composition is then applied to a suitable substrate, such as glass cloth, to form a "prepreg," and the resin, such as polyimide or epoxy, is cured to obtain a fire resistant composite or laminate.

The additive incorporated into the resin, as noted above, can be, for example a phosphonic or thiophosphonic diamide or triamide. Such compounds are soluble in the above noted resins, e.g. polyimide or epoxy, and upon curing of the resin composition and composite containing such compounds or additives, there is no adverse effect on the mechanical properties of the cured composite or laminate. Such composite offers substantial protection against burning, particularly at high temperatures, e.g. at 2,000° F. and above. At such temperatures, e.g. a 2,000° F. flame condition, the presence of a sufficient amount of the above additive in the composite results in stabilization of the resin char which is formed. This enables such char to hold the fibers of the substrate, e.g. glass or graphite fibers, together and maintain the structural stability and integrity of the composite or laminate. The resin char also has reduced thermal conductivity due to the heat dissipation capability of the carbonaceous residue.

The phosphorylated amide according to the invention, preferably is incorporated into a polyimide or epoxy resin. Such polyimide can be either a condensation type polyimide or an addition type polyimide. Epoxy resins which can be employed include the epoxy resin produced by condensation of bisphenol A and epichlorohydrin. Other resins into which the phosphorylated amide additive of the invention also can be incorporated include polybenzimidazoles, polyesters, polyquinoxylines, polyacrylates, phenolic polymers and silicones, in order to enhance their fire resistance. The polybenzimidazole is the reaction product of 2,2'-diamino benzidine with the phenyl ester of p,p'-diphenyl ether benzoic acid; the polyquinoxyline is the reaction product of 2,2'-diamino benzidine with a bis-benzene glyoxal. Examples of phenolic polymers which can be employed are the phenol-formaldehyde resins, and examples of silicones are dimethyl polysiloxanes and methyl phenyl polysiloxanes. Examples of polyacrylates are polymethyl acrylate and polymethyl methacrylate. It has been found that the phosphorylated amide additives are capable of chemically bonding to the above resins and become an integral part of the cured resin composition, and not merely an admixture of the additive and the resin. Thus, the additive cannot be leached out of the cured composition.

The phosphorylated amide additive such as, for example, phenyl phosphonic diamide, can be added to the resin, e.g. polyimide, in varying proportions, e.g. ranging from about 5 to about 40 parts, per 100 parts of resin, e.g. polyimide, by weight, to produce the resin compositions of the invention.

Substrates to which the resin compositions of the invention can be applied, include graphite fibers or fabric, glass fibers or fabric, particularly high silica glass fabric such as the material marketed as "Refrasil", low melting point metals such as aluminum, and the like. The resin composition containing the phosphorylated amide additives, e.g. polyimide containing the phenyl phosphonic diamide, and substrate, can be formed into several plies to produce a composite or laminate, and cured.

In addition to use in aircraft engines, the composites of the invention containing the above additive can also be used as fire walls in homes, in autos (between the passenger compartment and either the engine or the gas tank), in trains, etc.

DESCRIPTION OF PREFERRED EMBODIMENTS

As previously noted, the additive employed according to the invention, i.e. the phosphorylated amide, can be employed in an amount ranging from about 5 to about 40 parts, per 100 parts of resin or resin solids, by weight, but preferably is employed in an amount ranging from about 10 to about 40 parts, per 100 parts of resin or resin solids, by weight. The additive employed has the general formula:

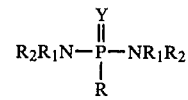

where Y is O or S, R is H, alkyl, with straight chain or branched chain, and generally containing from about 1 to about 6 carbon atoms, e.g. methyl, ethyl, propyl, isopropyl, butyl, isobutyl, pentyl, hexyl and isohexyl; cycloalkyl, generally containing from about 5 to about 7 carbon atoms, such as, for example, cyclopentyl, cyclohexyl, methyl cyclohexyl; aryl, generally containing from about 6 to about 14 carbon atoms, such as phenyl, xylyl, tolyl, naphthyl, methylnaphythyl and ethylnaphthyl; the corresponding halogenated alkyl and aryl groups including, for example, the chlorinated, brominated and fluorinated derivatives, e.g. chloromethyl and chlorophenyl; nitroaryl containing about 6 to about 14 carbon atoms, such as nitrophenyl, nitrotolyl, and the like; heterocyclic containing 5 to 6 members in the heterocyclic nucleus, and O, N and S as hetero atoms, e.g. furanyl, pyridyl, pyrrolyl, quinolyl and thiophene; amino, alkylamino containing from about 1 to about 8 carbon atoms in the alkyl group, e.g. methylamino, ethylamino, dimethylamino, diethylamino; arylamino containing from about 6 to about 14 carbon atoms, such as phenylamino and naphthylamino, alkoxy containing from 1 to about 4 carbon atoms such as methoxy, oxyethyl, oxypropyl, and aryloxy containing about 6 to about 14 carbon atoms such as phenoxy, tolyloxy and oxynaphthyl, and the like; where $R_1$ and $R_2$ can be the same, or different, and can be H, alkyl, aryl, alkylamino, arylamino, and cycloalkyl, all as defined above for R, and amino, aliphatic acyl containing from about 1 to about 7 carbon atoms such as formyl, acetyl, propionyl, and including cycloalkylacyl such as cyclohexylacyl, aroyl containing about 7 to about 11 carbon atoms such as benzoyl and naphthoyl, and the like.

Preferred additives are those wherein R is alkyl, aryl or the chlorinated derivatives thereof.

Examples of specific additives, according to the invention are:

TABLE
AMIDES OF VARIOUS PHOSPHONIC ACIDS (1) Phenyl Phosphonic Diamide (2) Phenyl Phosphonic P—Phenylene Diamine Diamide (2:1 Product)

(3) Phenyl Thiophosphonic Diamide (4) Chlorendic Anhydride Reaction Product with Phenyl Thiophosphonic Diamide (5) Cyclohexyl Phosphonic Diamide (6) Methyl Thiophosphonic Diamide (7) Diethylaminophosphonic Diamide (8) Phenylphosphonic Ortho Phenylene Diamine Diamide (2:1 Product)

(9) Phosphonic Triamide

Compounds of the type shown above can be prepared in various ways, as illustrated in the examples below.

EXAMPLE I

A representative preparation of the diamides is given by the preparation of phenylphosphonic diamide.

One mole of phenyl phosphonic dichloride was dissolved in one liter of methylene chloride and chilled in a dry ice/ethylene glycol bath.

Into this solution, 4.4 moles of ammonia was bubbled over a period of about 90 minutes. After the system was warmed to room temperature, the solution was filtered and the solid residue slurried in water and filtered under vacuum. The ammonium chloride was removed in the water solution. The solid phenylphosphonic diamide product was dried at 100° C. under vacuum to give pure phenyl phosphonic diamide (mp. 187°–191° C.).

EXAMPLE II

The resulting diamides can be reacted in various ways. One was to treat the amide with an anhydride. Representative of this type of reaction was the reaction of phenylthiophosphonic diamide with chlorendic anhydride.

To 0.2 moles of phenylthiophosphonic diamide, in 400 mls of diethyl ether, was added 0.4 mole of chlorendic anhydride and the mixture allowed to stand for one week. The ether was evaporated and the diadduct left behind. It had a melting point of 123° C.

EXAMPLE III

A 2:1 molar reaction of para-phenylene diamine to phenylphosphonic dichloride was effected by dissolving two moles of para-phenylenediamine in one liter of methylene chloride plus two moles of triethylamine and adding dropwise one mole of phenylphosphonic dichloride. An exothermic reaction occurred, and after the addition was complete, the mixture was heated to reflux for two hours and the solvent was then evaporated off. The resultant solid product was slurried in two liters of water to remove the triethylamine hydrochloride and the resultant solid was filtered and dried in a vacuum oven. In a similar reaction, using ortho-phenylenediamine in a one-to-one molar ratio with a phenylphosphonic dichloride, the product was a cyclic compound with a melting point of 220°–221° C.

The phosphorylated amide additives can be added to the resin, e.g. polyimide, in the required amount, and the resulting mixture applied to the substrate such as graphite fabric or glass fabric, to form a composite or laminate utilizing, e.g. a plurality of fiberglass or graphite cloth plies. The composite is heated at elevated temperature ranging from about 200 to about 350° F. for curing, usually, although not necessarily, followed by a post curing operation at higher temperatures, e.g. ranging from about 400° to about 600° F.

The phosphorylated amide additive is added to the resin, e.g. polyimide, or such additive can be first incorporated in a solvent such as N-methyl pyrrolidone, and the resulting solution is then employed to impregnate the substrate such as graphite fabric or glass cloth, to form a composite or laminate, which is then cured as noted above.

The cured composites or laminates are subjected to flame tests employing a burner flame at a temperature of 2,000° F. In these tests the sample composite is mounted vertically, and the flame is impinged on the front face of the composite or laminate, and the temperature of the front face at 2,000° F. is monitored by a thermocouple. Under such conditions samples with substantially reduced burn-off areas on the back face of the composite or laminate after exposure to the 2,000° F. flame for 15 minutes show stabilization and thermal stability of the resin char and reduced thermal conductivity of the char due to the presence of the amide additive.

The following are examples of practice of the invention:

EXAMPLE IV 30 grams of the phenyl phosphonic diamide was dissolved in 135 grams of Skybond 703 polyimide varnish (a condensation type polyimide marketed by Monsanto as a 67 percent solids solution). The resulting solution was used to impregnate 8 plies of a 9-inch square 181 Fiberglass cloth (marketed by Owens Corning).

The resulting resin impregnated glass cloth laminate was vacuum bagged and maintained at 28 inches of mercury, and initially heated for one hour at 175° F. The temperature was then increased over a period of 3 hours to 350° F. and maintained at that temperature for about 2½ hours. The laminate was then removed from the vacuum bag and post-cured at a temperature of 550° F. for 4 hours.

Skybond 703 is usually sold as a polyamic acid varnish which is converted to a polyimide during heating and curing. However, Skybond 703 is usually referred to as the "polyimide varnish," even though it requires curing to convert it to the polyimide.

Samples of the resulting cured polyimide glass fabric laminate, and samples of a polyimide-impregnated glass laminate control employing the same amount of polyimide and using the same number of plies of 181 Fiberglass cloth, as for producing the polyimide glass fabric laminate above containing the additive of the invention, and cured by the procedure described above, were subjected to a Meeker burner flame maintained at 2,000° F. by means of a thermocouple, for a period of 15 minutes.

For the polyimide-glass fabric laminate control a large burn-off area was observed on the back, or rear face, of the laminate resulting from almost complete volatilization of resin and showed considerable delamination. Additionally, the backside temperature was around 1,200° F. On the other hand, for the polyimide impregnated glass fabric laminate containing the phenyl phosphonic diamide of the present example, essentially no burn-off areas on the back face of such polyimide glass laminate were observed, and the backside temperature was around 500° F.

This example accordingly shows that the resin char formed at the 2,000° F. flame temperature with the polyimide glass laminate of the invention containing the phenyl phosphonic diamide additive can be stabilized, and the resin char has reduced thermal conductivity. Thus, it can be seen that the presence of the phosphorylated amide additive in the resin stabilizes the char formed, and reduces the resin burn-off on the back face of the laminate as well as reducing the thermal conductivity of the char.

EXAMPLE V

The procedure of Example IV was substantially repeated except that 30 grams of the phenyl phosphonic diamide was employed in combination with 100 grams of Epon 828 Epoxy (a 100% solids material) manufactured by Shell Chemical Company.

The results obtained were similar to those obtained in Example IV.

EXAMPLE VI

The procedure of Example IV was repeated except that 30 grams of phenylthiophosphonic diamide was employed in place of the phenyl phosphonic diamide of Example IV. There was essentially no resin burn-off on the rear side of the polyimide glass cloth laminate treated with the above compound, as opposed to the untreated polyimide control of Example IV, and the backside temperature was about 450° F.

EXAMPLE VII

The procedure of Example VI was repeated using 30 grams of the same phosphorylated amide compound as in Example VI in 100 grams of Epon 828 Epoxy resin.

EXAMPLE VIII

The procedure of Example VI was repeated using 30 grams of the 1:1 reaction product of ortho-phenylenediamine to phenylphosphonic dichloride in place of the phenylphosphonic diamide. There was essentially no burn-off in the rear of the polyimide glass cloth laminate treated with the above compound, and the backside temperature was about 350° F.

EXAMPLE IX

The procedure of Example VIII was repeated using 30 grams of the 2:1 reaction product of ortho phenylenediamine to phenyl phosphonic dichloride in place of the 1:1 reaction product of Example VIII. The results were similar to Example VIII.

EXAMPLE X

One mole of phenylthiophosphonic diamide, prepared by reacting phenyl thiophosphonic dichloride with ammonia, was treated with two moles of chlorendic anhydride, and 30 grams of this product was added to 135 grams of a polyimide varnish, and a 181 Fiberglass cloth laminate, as in Example IV, was prepared, but without the phenyl phosphonic diamide of Example IV. When this laminate was subjected to a 2,000° F. flame, there was essentially no resin burn-off, and the backside temperature was about 400° F.

EXAMPLE XI

Using 30 grams of cyclohexyl phosphonic diamide to 135 grams of the polyimide varnish, as in Example IV, instead of the phenyl phosphonic diamide of Example IV, there was essentially no resin burn-off, and the backside temperature was about 390° F.

From the foregoing, it is seen that the invention provides a fire barrier composition and composite having high fire resistance and low thermal conductivity, by incorporating therein additives in the form of certain phosphorylated amides, and which function to stabilize the char formed from the resin at high temperatures, e.g. a 2,000° F. flame temperature, thereby permitting the char to hold the glass or graphite fibers of a fibrous substrate, such as fiberglass cloth, together and maintain the structural stability and integrity of the composite or laminate.

Since various modifications and changes will occur to those skilled in the art within the spirit of the invention, the invention is not to be taken as limited except by the scope of the appended claims.

What is claimed is:

1. A fire resistant composition having low thermal conductivity, consisting essentially of a mixture of a resin selected from the group consisting of polyimide, epoxy, polybenzimidazole, polyester, polyquinoxyline, phenolic and silicone resins; and a phosphorylated amide as an additive, said additive being soluble in said resin to provide a homogeneous composition, and which composition is capable of being cured and permanently bonded to a structural substrate to improve char characteristics and provide low thermal conductivity thereto and to permit such substrate to maintain structural integrity thereof when said composition is employed in an amount sufficient to form a cured stable resin char upon being heated by a flame to an elevated temperature of about 2000 degrees F., said phosphorylated amide having the general formula

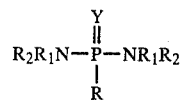

where Y is O or S, R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 14 carbon atoms, heterocyclic containing 5 to 6 members in the heterocyclic nucleus, and O, N or S as hetero atoms, and where $R_1$ and $R_2$ can be the same or different, and are selected from the group consisting of H, alkyl, aryl, and cycloalkyl, all as defined above for R, amino, alkylamino containing from about 1 to about 8 carbon atoms in the alkyl group, arylamino containing from about 6 to about 14 carbon atoms, aliphatic acyl containing from about 1 to about 7 carbon atoms, and aroyl containing from about 7 to about 11 carbon atoms.

2. A fire resistant composition as defined in claim 1, employing about 5 to 40 parts of said additive, per 100 parts of said resin, by weight.

3. The fire resistant composition as defined in claim 1, said resin selected from the group consisting of polyimide and epoxy resin.

4. A fire resistant composition as defined in claim 1, said additive being a phosphonic acid diamide or a thiophosphonic acid diamide.

5. The fire resistant composition as defined in claim 1, where R is hydrogen, alkyl, aryl or the chlorinated derivatives thereof.

6. The fire resistant composition as defined in claim 1 where $R_1$, and $R_2$ are each hydrogen.

7. The fire resistant composition as defined in claim 1 where at least $R_1$, or $R_2$ is aryl.

8. The fire resistant composition as defined in claim 1, where R is aryl.

9. The fire resistant composition as defined in claim 1, where R is phenyl.

10. The fire resistant composition as defined in claim 1, where R is alkyl.

11. The fire resistant composition as defined in claim 1, said resin being an epoxy, employing about 10 to about 40 parts of said additive, per 100 parts of said resin, by weight.

12. The fire resistant composition as defined in claim 1, wherein $R_1$ is H and $R_2$ is amino.

13. A fire resistant composite having low thermal conductivity, consisting essentially of a structural substrate selected from the group consisting of graphite fabric, glass fabric and a low melting point metal, containing a composition comprising a cured mixture of a resin selected from the group consisting of polyimide, epoxy, polybenzimidazole, polyester, polyquinoxyline, phenolic and silicone resins; and an additive consisting of a phosphorylated amide, said additive being soluble in said resin to provide a homogeneous composition and employed in an amount sufficient to enable formation of a stable resin char, and which composition is permanently bonded to said structural substrate thereby improving char characteristics and providing low thermal conductivity thereto and permitting such substrate to maintain structural integrity thereof when said composition is heated by a flame to a temperature of about 2000 degrees F., said additive being a phosphorylated amide having the general formula

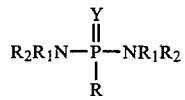

where Y is O or S, R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 14 carbon atoms, heterocyclic containing 5 to 6 members in the heterocyclic nucleus, and O, N or S as hetero atoms, and where $R_1$ and $R_2$ can be the same or different, and are selected from the group consisting of H, alkyl, aryl, and cycloalkyl, all as defined above for R, amino, alkylamino containing from about 1 to about 8 carbon atoms in the alkyl group, arylamino containing from about 6 to about 14 carbon atoms, aliphatic acyl containing from about 1 to about 7 carbon atoms, and aroyl containing from about 7 to about 11 carbon atoms.

14. The fire resistant composite as defined in claim 13, employing about 5 to about 40 parts of said additive, per 100 parts by weight of said resin.

15. The fire resistant composite as defined in claim 13, wherein said resin is selected from the group consisting of polyimide and epoxy resins.

16. The fire resistant composite as defined in claim 13, said additive being employed in an amount of about 10 to about 40 parts, per 100 parts of said resin, by weight.

17. The fire resistant composite as defined in claim 13, where $R_1$ and $R_2$ are each hydrogen.

18. The fire resistant composite as defined in claim 13, where at least $R_1$ or $R_2$ is aryl.

19. The fire resistant composite as defined in claim 13, where R is aryl.

20. The fire resistant composite as defined in claim 13, where Y is O, $R_1$ and $R_2$ are each hydrogen and R is aryl.

21. The fire resistant composite as defined in claim 13, where R is alkyl.

22. A fire resistant composition having low thermal conductivity, consisting essentially of a mixture of a resin selected from the group consisting of epoxies and condensation polymers; and a phosphorylated amide as an additive; and which resin is selected so that it has the following properties and characteristics (1) the additive is soluble in the resin and (2) when contacted with the additive such resin will form a stable resin char when heated by a flame to an elevated temperature of about 2000 degrees F. and (3) the fire resistance of the resin is increased and its thermal conductivity is decreased when contacted by the additive and so heated; said composition being capable of being cured and permanently bonded to a structural substrate to improve char characteristics and provide low thermal conductivity thereto and to permit such substrate to maintain structural integrity thereof, said additive being solubilized in said resin to form a homogeneous composition and employed in an amount sufficient to form said stable resin char when said composition is heated by a flame to an elevated temperature of about 2000 degrees F.; said phosphorylated amide having the following general formula

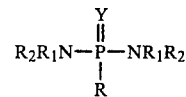

where Y is O or S, R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 14 carbon atoms, heterocyclic containing 5 to 6 members in the heterocyclic nucleus, and O, N or S as hetero atoms, and where $R_1$ and $R_2$ can be the same or different, and are selected from the group consisting of H, alkyl, aryl, and cycloalkyl, all as defined above for R, amino, alkylamino containing from about 1 to about 8 carbon atoms in the alkyl group, arylamino containing from about 6 to about 14 carbon atoms, aliphatic acyl containing from about 1 to about 7 carbon atoms, and aroyl containing from about 7 to about 11 carbon atoms.

23. A fire resistant composition as defined in claim 22, employing about 5 to 40 parts of said additive, per 100 parts of said resin, by weight.

24. The fire resistant composition as defined in claim 22, said resin is selected from the group consisting of polyimide and epoxy resins.

25. A fire resistant composition as defined in claim 22, said additive being a phosphonic acid diamide or a thiophosphonic acid diamide.

26. The fire resistant composition as defined in claim 22, where R is hydrogen, alkyl, aryl or the chlorinated derivatives thereof.

27. The fire resistant composition as defined in claim 22 where $R_1$, and $R_2$ are each hydrogen.

28. The fire resistant composition as defined in claim 22 where at least $R_1$, or $R_2$ is aryl.

29. The fire resistant composition as defined in claim 22, where at least $R_1$, or $R_2$ is aroyl.

30. The fire resistant composition as defined in claim 22, where R is aryl.

31. The fire resistant composition as defined in claim 22, where R is phenyl.

32. The fire resistant composition as defined in claim 22, where R is alkyl.

33. The fire resistant composition as defined in claim 22, said resin being a polyimide, employing about 10 to about 40 parts of said additive, per 100 parts of said resin, by weight.

34. The fire resistant composition as defined in claim 22, said resin being an epoxy, employing about 10 to about 40 parts of said additive, per 100 parts of said resin, by weight.

35. The fire resistant composition as defined in claim 22, wherein $R_1$ is H and $R_2$ is amino.

36. A fire resistant composite having low thermal conductivity, consisting essentially of a structural substrate selected from the group consisting of graphite fabric, glass fabric and a low melting point metal, containing a composition comprising a cured mixture of a resin selected from the group consisting of epoxies and condensation polymers and an additive consisting of a phosphorylated amide, and which resin is selected so that it has the following properties and characteristics (1) the additive is soluble in the resin and (2) when contacted with the additive such resin will form a stable resin char when heated to an elevated temperature about 2000 degrees F. and (3) the fire resistance of the resin is increased and its thermal conductivity is decreased when contacted by the additive and so heated; said composition being permanently bonded to a structural substrate improving char characteristics and providing low thermal conductivity thereto and permitting such substrate to maintain structural integrity thereof, said additive being solubilized in said resin to form a homogeneous composition and employed in an amount sufficient to form said stable resin char when said composition is heated by a flame to an elevated temperature of about 2000 degrees F.; said additive is a phosphorylated amide having the general formula

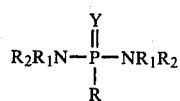

where Y is O or S, R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 14 carbon atoms, heterocyclic containing 5 to 6 members in the heterocyclic nucleus, and O, N or S as hetero atoms, and where $R_1$, and $R_2$ can be the same or different, and are selected from the group consisting of H, alkyl, aryl, and cycloalkyl, all as defined above for R, amino, alkylamino containing from about 1 to about 8 carbon atoms in the alkyl group, arylamino containing from about 6 to about 14 carbon atoms, aliphatic acyl containing from about 1 to about 7 carbon atoms, and aroyl containing from about 7 to about 11 carbon atoms.

37. The fire resistant composite as defined in claim 36, employing about 5 to about 40 parts of said additive, per 100 parts by weight of said resin.

38. The fire resistant composite as defined in claim 36 wherein said resin is selected from the group consisting of polyimide and epoxy resins.

39. The fire resistant composite as defined in claim 36, said additive being employed in an amount of about 10 to about 40 parts, per 100 parts of said resin, by weight.

40. The fire resistant composite as defined in claim 36, where $R_1$, and $R_2$ are each hydrogen.

41. The fire resistant composite as defined in claim 36, where at least $R_1$ or $R_2$ is aryl.

42. The fire resistant composite as defined in claim 36, where R is aryl.

43. The fire resistant composite as defined in claim 36, where Y is O, $R_1$ and $R_2$ are each hydrogen and R is aryl.

44. The fire resistant composite as defined in claim 36, where R is alkyl.

45. The fire resistant composite as defined in claim 36, where at least $R_1$ or $R_2$ is aroyl.

46. The fire resistant composite as defined in claim 36, where said resin is a polyimide, employing about 10 to about 40 parts of said additive per 100 parts of said resin, by weight.

47. A fire resistant composition having low thermal conductivity, consisting essentially of a cured mixture of a resin selected from the group consisting of polyimide, epoxy, polybenzimidazole, polyester, polyquinoxyline, polyacrylate, phenolic and silicone resins; and a phosphorylated amide as an additive, said additive being soluble in said resin and employed in an amount sufficient to form a stable resin char upon being heated by a flame to an elevated temperature of about 2000 degrees F., said phosphorylated amide having the general formula

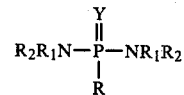

where Y is O or S, R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 14 carbon atoms, heterocyclic containing 5 to 6 members in the heterocyclic nucleus, and O, N or S as hetero atoms, and where $R_1$ and $R_2$ can be the same or different, and are selected from the group consisting of H, alkyl, aryl, and cycloalkyl, all as defined above for R, amino, alkylamino containing from about 1 to about 8 carbon atoms in the alkyl group, arylamino containing from about 6 to about 14 carbon atoms, aliphatic acyl containing from about 1 to about 7 carbon atoms, and aroyl containing from about 7 to about 11 carbon atoms, and where at least $R_1$ or $R_2$ is aroyl.

48. A fire resistant composition having low thermal conductivity, consisting essentially of a cured mixture of a polyimide resin and phosphorylated amide as additive, said additive being soluble in said resin and employed in an amount of about 40 parts of additive per 100 parts of resin by weight to form a stable resin char upon being heated by a flame to an elevated temperature of about 2000 degrees F., said phosphorylated amide having the general formula

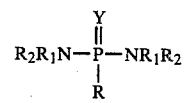

where Y is O or S, R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 14 carbon atoms, heterocyclic containing 5 to 6 members in the heterocyclic nucleus, and O, N or S as hetero atoms, and where $R_1$ and $R_2$ can be the same or different, and are selected from the group consisting of H, alkyl, aryl, and cycloalkyl, all as defined above for R, amino, alkylamino containing from about 1 to about 8 carbon atoms in the alkyl group, arylamino containing from about 6 to about 14 carbon atoms, aliphatic acyl containing from about 1 to about 7 carbon atoms, and aroyl containing from about 7 to about 11 carbon atoms.

49. A method of rendering a structural substrate composite with properties of low thermal conductivity and increased fire resistance and ability to maintain structural integrity when heated by a flame to a temperature of about 2000 degrees F., said method comprising bonding to said substrate a fire resistant composition and curing said composition and which composition consists essentially of a mixture of a resin selected from the group consisting of polyimide, epoxy, polybenzimidazole, polyester, polyquinoxyline, polyacrylate, phenolic and silicone resins, and a phosphorylated amide as an additive; said additive being soluble in said resin and said resin being present in an amount sufficient and said composition being employed in an amount sufficient to form a cured stable resin char and to permit the substrate to maintain structural integrity when said composition is heated by a flame to an elevated temperature of about 2000 degrees F., said phosphorylated amide having the general formula

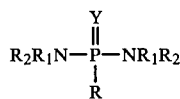

where Y is O or S, R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 14 carbon atoms, heterocyclic containing 5 to 6 members in the heterocyclic nucleus, and O, N or S as hetero atoms, and where R and $R_2$ can be the same or different, and are selected from the group consisting of H, alkyl, aryl, and cycloalkyl, all as defined above for R, amino, alkylamino containing from about 1 to about 8 carbon atoms in the alkyl group, arylamino containing from about 6 to about 14 carbon atoms, aliphatic acyl containing from about 1 to about 7 carbon atoms, and aroyl containing from about 7 to about 11 carbon atoms.

50. A fire resistant composition having low thermal conductivity, consisting essentially of a cured mixture of a resin selected from the group consisting of polyimide, epoxy, polybenzimidazole, polyester, polyquinoxyline, polyacrylate, phenolic and silicone resins, and a phosphorylated amide as an additive; said additive being soluble in said resin and employed in an amount sufficient to form a stable resin char upon being heated by a flame to an elevated temperature of about 2000 degrees F., said phosphorylated amide having the general formula

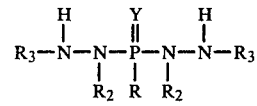

where Y is O or S, R is selected from the group consisting of H, alkyl containing from about 1 to about 6 carbon atoms, cycloalkyl containing from about 5 to 7 carbon atoms, aryl containing from about 6 to about 14 carbon atoms, the corresponding halogenated alkyl and aryl groups, nitroaryl containing about 6 14 carbon atoms, heterocyclic containing 5 to 6 members in the heterocyclic nucleus, and O, N or S as hetero atoms; $R_2$ is selected from the group consisting of H, alkyl containing from about 1 to about 6 carbon atoms, and aryl containing from about 6 to about 14 carbon atoms; and $R_3$ is selected from the group consisting of H, aryl containing from about 6 to about 14 carbon atoms, and cycloalkyl containing from about 1 to about 8 carbon atoms.

51. A fire resistant composite having low thermal conductivity, consisting essentially of a substrate selected from the group consisting of graphite fabric, glass fabric and a low melting point metal containing composition comprising a cured mixture of a resin selected from the group consisting of polyimide, epoxy, polybenzimidazole, polyester, polyquinoxyline, polyacrylate, phenolic and silicone resins, and a phosphorylated amide as an additive; said additive being soluble in said resin and employed in an amount sufficient to form a stable resin char upon being heated by a flame to an elevated temperature of about 2000 degrees F., said phosphorylated amide having the general formula

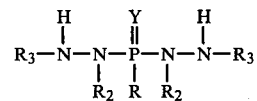

where Y is O or S, R is selected from the group consisting of H, alkyl containing from about 1 to about 6 carbon atoms, cycloalkyl containing from about 5 to 7 carbon atoms, aryl containing from about 6 to about 14 carbon atoms, the corresponding halogenated alkyl and aryl groups, nitroaryl containing about 6 14 carbon atoms, heterocyclic containing 5 to 6 members in the heterocyclic nucleus, and O, N or S as hetero atoms; $R_2$ is selected from the group consisting of H, alkyl containing from about 1 to about 6 carbon atoms, and aryl containing from about 6 to about 14 carbon atoms; and $R_3$ is selected from the group consisting of H, aryl containing from about 6 to about 14 carbon atoms, and cycloalkyl containing from about 1 to about 8 carbon atoms.

* * * * *